(12) United States Patent
Shpak

(10) Patent No.: US 7,177,661 B2
(45) Date of Patent: Feb. 13, 2007

(54) COMMUNICATION BETWEEN WIRELESS ACCESS POINTS OVER LAN CABLING

(75) Inventor: Eran Shpak, Tel Aviv (IL)

(73) Assignee: Extricom Ltd., Herzeliya (IL)

( * ) Notice: Subject to any disclaimer, the term of this patent is extended or adjusted under 35 U.S.C. 154(b) by 521 days.

(21) Appl. No.: 10/321,879

(22) Filed: Dec. 17, 2002

(65) Prior Publication Data

US 2003/0207697 A1 Nov. 6, 2003

Related U.S. Application Data

(63) Continuation-in-part of application No. 10/214,271, filed on Aug. 7, 2002.

(60) Provisional application No. 60/377,645, filed on May 6, 2002, provisional application No. 60/377,646, filed on May 6, 2002, provisional application No. 60/377,647, filed on May 6, 2002, provisional application No. 60/377,650, filed on May 6, 2002.

(51) Int. Cl.
 *H04J 1/00* (2006.01)

(52) U.S. Cl. .................. 455/524; 455/525; 455/456.1; 455/435.1; 370/328; 370/338; 370/349; 370/480

(58) Field of Classification Search ................ 455/524, 455/525, 456.1, 435.1; 370/328, 338, 462, 370/349, 480
See application file for complete search history.

(56) References Cited

U.S. PATENT DOCUMENTS

| | | | |
|---|---|---|---|
| 5,923,702 A * | 7/1999 | Brenner et al. ............. 375/133 |
| 5,960,344 A | 9/1999 | Mahany | |
| 6,047,175 A * | 4/2000 | Trompower ............... 455/452.1 |
| 6,192,026 B1 | 2/2001 | Pollack et al. | |
| 6,259,898 B1 * | 7/2001 | Lewis ......................... 455/103 |
| 6,393,261 B1 * | 5/2002 | Lewis ......................... 455/103 |
| 6,529,164 B1 | 3/2003 | Carter | |
| 6,560,448 B1 | 5/2003 | Baldwin et al. | |
| 6,580,704 B1 | 6/2003 | Wellig et al. | |
| 6,590,884 B1 | 7/2003 | Panasik | |
| 6,671,284 B1 * | 12/2003 | Yonge et al. ................ 370/462 |
| 6,674,403 B2 | 1/2004 | Gray et al. | |
| 2002/0114303 A1 | 8/2002 | Crosbie et al. | |
| 2002/0197984 A1 | 12/2002 | Monin et al. | |
| 2003/0012174 A1 * | 1/2003 | Bender et al. .............. 370/347 |
| 2003/0063593 A1 | 4/2003 | Koyanagi et al. | |
| 2003/0133422 A1 * | 7/2003 | Bims ........................... 370/328 |

(Continued)

OTHER PUBLICATIONS

ANSI/IEEE Standard 802.11 (1999 Edition), Part 11: Wireless LAN Medium Access Control (MAC) and Physical Layer (PHY) Specifications.

*Primary Examiner*—Nay Maung
*Assistant Examiner*—Alan T. Gantt
(74) *Attorney, Agent, or Firm*—Welsh & Katz, Ltd.

(57) ABSTRACT

Apparatus for network communication includes a cable arranged to form a wired local area network (LAN), the cable comprising at least first and second conductors. A plurality of access points are interconnected by the cable and are arranged in a wireless local area network (WLAN) to communicate over the air on a common frequency channel with a mobile station. The access points are adapted to convey data to and from the mobile station over the LAN via the first conductor and to exchange control messages among the access points via the second conductor.

22 Claims, 5 Drawing Sheets

U.S. PATENT DOCUMENTS

2003/0137959 A1* 7/2003 Nebiker et al. ............. 370/338
2003/0174681 A1 9/2003 Gilberton et al.
2003/0181221 A1 9/2003 Nguyen

* cited by examiner

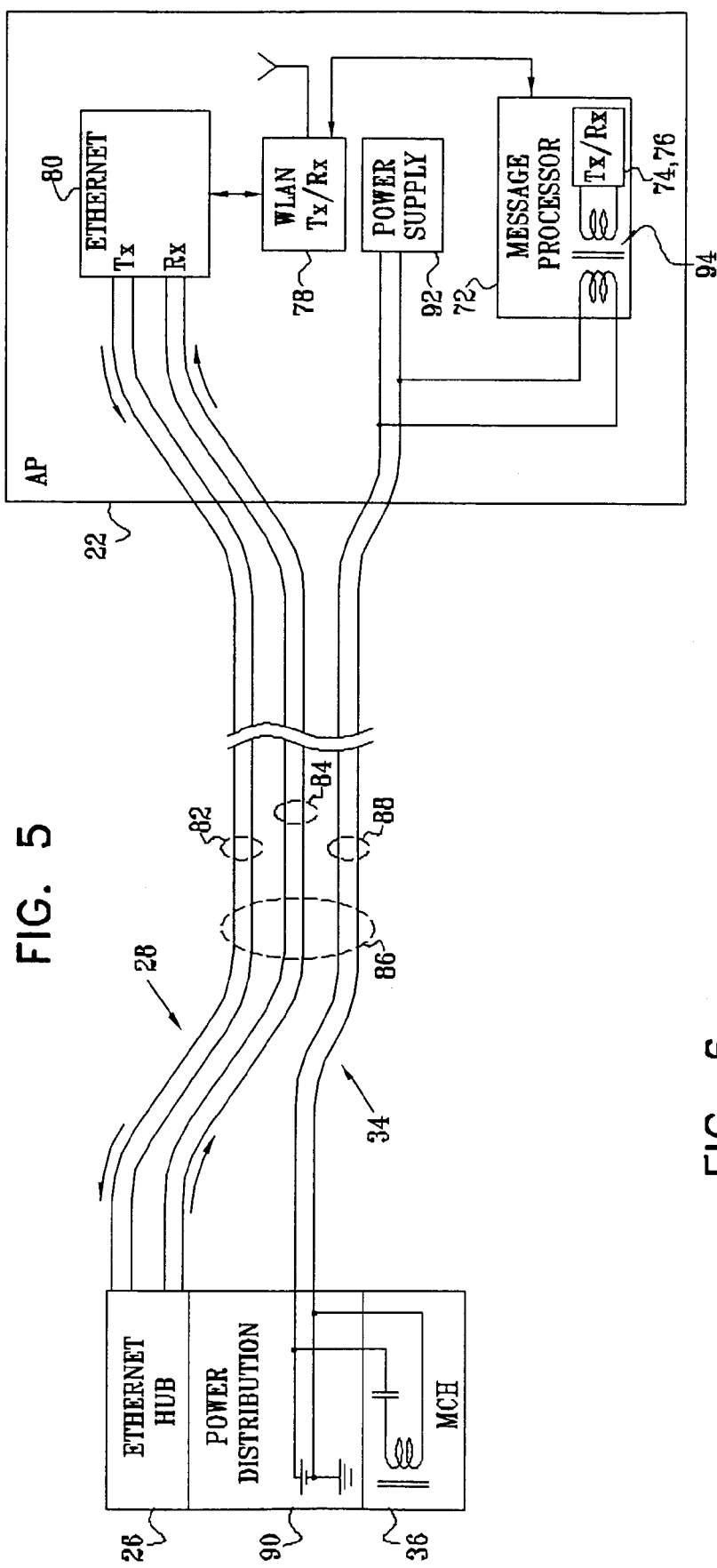

COMMUNICATION BETWEEN WIRELESS ACCESS POINTS OVER LAN CABLING

CROSS-REFERENCE TO RELATED APPLICATIONS

This application claims the benefit of U.S. Provisional Patent Applications 60/377,645, 60/377,646, 60/377,647 and 60/377,650, all of which were filed May 6, 2002. This application is a continuation-in-part of a U.S. patent application Ser. No. 10/214,271 entitled "Collaboration Between Wireless LAN Access Points," filed Aug. 7, 2002. All these, related applications are incorporated herein by reference.

FIELD OF THE INVENTION

The present invention relates generally to wireless communications, and specifically to methods and devices for improving the performance of wireless local area networks.

BACKGROUND OF THE INVENTION

Wireless local area networks (WLANs) are gaining in popularity, and new wireless applications are being developed. The original WLAN standards, such as "Bluetooth" and IEEE 802.11, were designed to enable communications at 1–2 Mbps in a band around 2.4 GHz. More recently, IEEE working groups have defined the 802.11a, 802.11b and 802.11g extensions to the original standard, in order to enable higher data rates. The 802.11a standard, for example, envisions data rates up to 54 Mbps over short distances in a 5 GHz band, while 802.11b defines data rates up to 22 Mbps in the 2.4 GHz band. In the context of the present patent application and in the claims, the term "802.11" is used to refer collectively to the original IEEE 802.11 standard and all its variants and extensions, unless specifically noted otherwise.

The theoretical capability of new WLAN technologies to offer enormous communication bandwidth to mobile users is severely hampered by the practical limitations of wireless communications. Indoor propagation of radio frequencies is not isotropic, because radio waves are influenced by building layout and furnishings. Therefore, even when wireless access points are carefully positioned throughout a building, some "black holes" generally remain—areas with little or no radio reception. Furthermore, 802.11 wireless links can operate at full speed only under conditions of high signal/noise ratio. Signal strength scales inversely with the distance of the mobile station from its access point, and therefore so does communication speed. A single mobile station with poor reception due to distance or radio propagation problems can slow down WLAN access for all other users in its basic service set (BSS—the group of mobile stations communicating with the same access point).

The natural response to these practical difficulties would be to distribute a greater number of access points within the area to be served. If a receiver receives signals simultaneously from two sources of similar strength on the same frequency channel, however, it is generally unable to decipher either signal. The 802.11 standard provides a mechanism for collision avoidance known as clear channel assessment (CCA), which requires a station to refrain from transmitting when it senses other transmissions on its frequency channel. In practice, this mechanism is of limited utility and can place a heavy burden on different BSSs operating on the same frequency channel.

Therefore, in 802.11 WLANs known in the art, access points in mutual proximity must use different frequency channels. Theoretically, the 802.11b and 802.11g standards define 14 frequency channels in the 2.4 GHz band, but because of bandwidth and regulatory limitations, WLANs operating according to these standards in the United States actually have only three different frequency channels from which to choose. (In other countries, such as Spain, France and Japan, only one channel is available.) As a result, in complex, indoor environments, it becomes practically impossible to distribute wireless access points closely enough to give strong signals throughout the environment without substantial overlap in the coverage areas of different access points operating on the same frequency channel.

SUMMARY OF THE INVENTION

It is an object of some aspects of the present invention to provide methods and devices for enhancing the coverage and speed of WLAN systems.

In preferred embodiments of the present invention, a WLAN system comprises multiple wireless access points, which are distributed within a service region and are available for data communications with mobile stations in the region. The access points are connected together in a wired LAN for conveying data to and from the mobile stations and, typically, between the mobile stations and external networks. The wired LAN comprises a cable, such as CAT-5 cable, having multiple conductors, not all of which are needed for conveying data to and from the mobile stations. The access points therefore use one or more of the conductors that are not needed for LAN data communications in order to pass control messages among themselves.

The access points typically use these control messages for coordinating operations among themselves. For example, the access points may use the control messages to decide which of the access points will respond to a mobile unit sending an uplink message over the WLAN. The "spare" conductors of the LAN cabling are preferably configured as a high-speed shared medium, whose latency is low enough to permit this sort of coordination without adverse effect on WLAN operation. (Typically, an Ethernet LAN has message latency on the order of milliseconds, while the shared medium of the present invention can be configured for latency in the microsecond range.) High-speed coordination among access points improves significantly the speed and consistency of service that the WLAN can provide to mobile stations. By using spare conductors in existing LAN cabling, this enhanced WLAN service can be provided with almost no additional infrastructure cost in comparison to WLANs known in the art.

In some preferred embodiments of the present invention, the "spare" conductors in the LAN cabling are also used to convey DC electrical power to some or all of the access points. The control messages may be sent over the same conductors as the DC power by high-frequency modulation. Suitable AC couplers are used at the access points to separate the modulated control messages from the DC power.

There is therefore provided, in accordance with a preferred embodiment of the present invention, apparatus for network communication, including:

a cable arranged to form a wired local area network (LAN), the cable including at least first and second conductors; and a plurality of access points interconnected by the cable and arranged in a wireless local area network (WLAN)

to communicate over the air on a common frequency channel with a mobile station, the access points being adapted to convey data to and from the mobile station over the LAN via the first conductor and to exchange control messages among the access points via the second conductor.

Typically, the access points are adapted to convey the data over the LAN in accordance with a first media access control (MAC) protocol, and to exchange the control messages using a second MAC protocol, different from the first MAC protocol, wherein the first MAC protocol is characterized by a first latency, and wherein the second MAC protocol is characterized by a second latency, which is lower than the first latency. The first MAC protocol may include an Ethernet protocol. The second MAC protocol preferably includes a multiple access protocol, which can be used by two or more of the access points to transmit the control messages over the second conductor substantially simultaneously. In a preferred embodiment, the multiple access protocol includes a code division multiple access (CDMA) protocol.

Preferably, the second conductor is configured as a shared medium, so that the control messages transmitted onto the second conductor by any of the access points are received by all the other access points via the shared medium. Typically, the apparatus includes a switching hub, which is coupled to the first conductor so as to control a flow of the data to and from the access points over the LAN, substantially without affecting the control messages on the second conductor.

In a preferred embodiment, the apparatus includes a DC power source, which is coupled to provide electrical power to the access points over the second conductor, wherein the access points include modulation circuitry, coupled to the second conductor, for conveying the control messages over the second conductor simultaneously with the electrical power.

Typically, the cable includes multiple twisted wire pairs, including at least a first wire pair that includes the first conductor, and at least a second wire pair that includes the second conductor. For example, the cable may include a Category 5 (CAT-5) cable.

In a preferred embodiment, the access points include message processors, coupled to the second conductor, which are adapted, upon receiving at one or more of the access points an uplink signal transmitted over the WLAN by the mobile station on the common frequency channel, to arbitrate among the access points receiving the uplink signal by sending and receiving the control messages over the second conductor so as to select one of the access points to respond to the uplink signal.

There is also provided, in accordance with a preferred embodiment of the present invention, a method for network communication, including:

arranging a plurality of access points in a wireless local area network (WLAN) to communicate over the air on a common frequency channel with a mobile station;

linking the access points together by a cable to form a wired local area network (LAN), the cable including at least first and second conductors; and conveying data via the first conductor over the LAN to and from the access points for transmission over the air to and from the mobile station; and exchanging control messages among the access points via the second conductor.

The present invention will be more fully understood from the following detailed description of the preferred embodiments thereof, taken together with the drawings in which:

BRIEF DESCRIPTION OF THE DRAWINGS

FIG. 5 is a block diagram that schematically illustrates communication and power links between an access point and a hub in a WLAN system, in accordance with a preferred embodiment of the present invention; and FIG. 6 is a block diagram that schematically illustrates a message packet exchanged between access points in a WLAN system, in accordance with a preferred embodiment of the present invention.

DETAILED DESCRIPTION OF PREFERRED EMBODIMENTS

Figure 1:
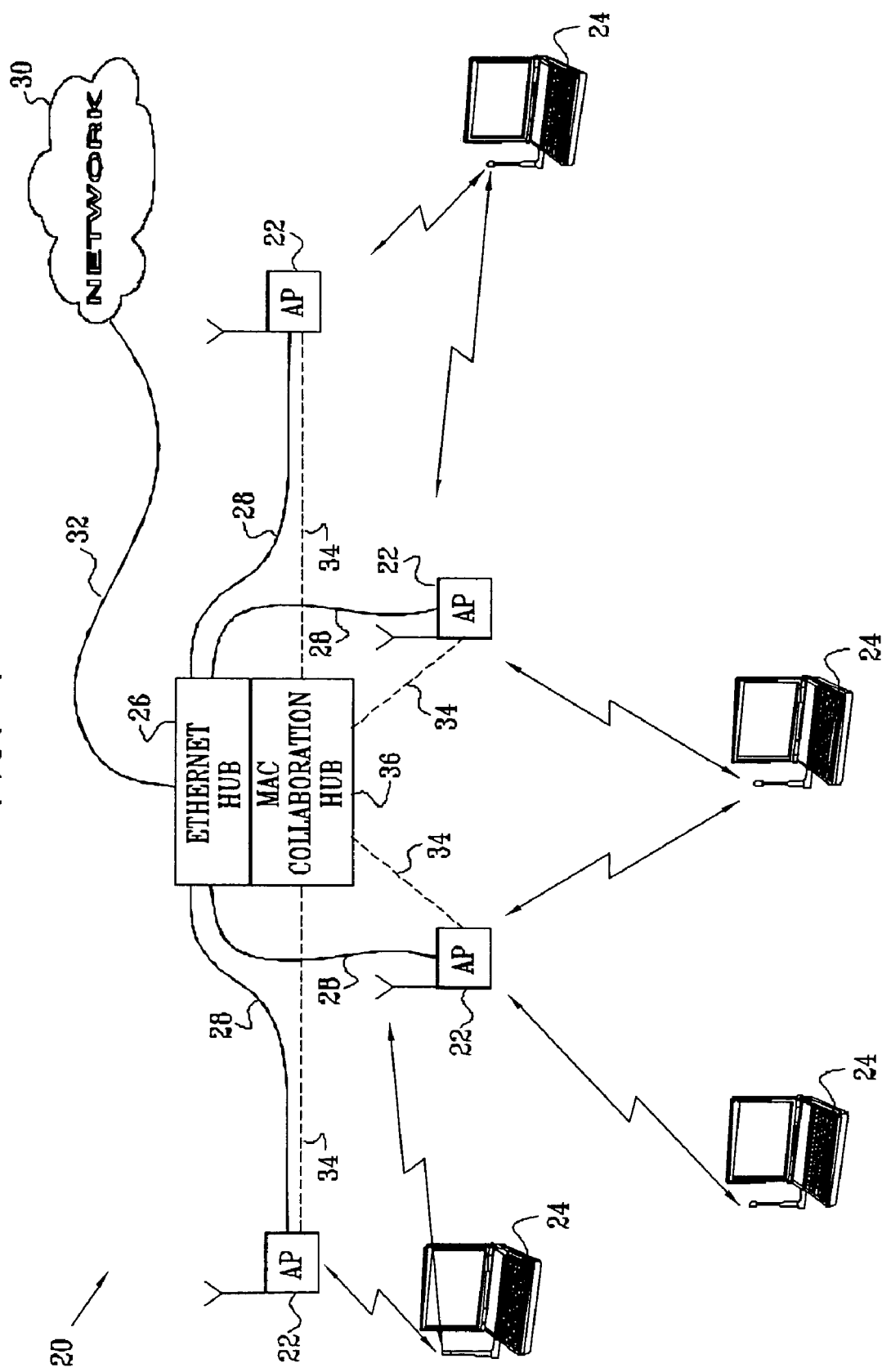
FIG. 1 is a block diagram that schematically illustrates a WLAN system, in accordance with a preferred embodiment of the present invention.

FIG. 1 is a block diagram that schematically illustrates a wireless LAN (WLAN) system 20, in accordance with a preferred embodiment of the present invention. System 20 comprises multiple access points 22, which are configured for data communication with mobile stations 24. The mobile stations typically comprise computing devices, such as desktop, portable or handheld devices, as shown in the figure. In the exemplary embodiments described hereinbelow, it is assumed that the access points and mobile stations communicate with one another in accordance with one of the standards in the IEEE 802.11 family and observe the 802.11 medium access control (MAC) layer conventions. Details of the 802.11 MAC layer are described in ANSI/IEEE Standard 801.11 (1999 Edition), and specifically in Part 11: Wireless LAN Medium Access Control (MAC) and Physical Layer (PHY) Specifications, which is incorporated herein by reference. The principles of the present invention, however, are not limited to the 802.11 standards, and may likewise be applied to substantially any type of WLAN, including HiperLAN, Bluetooth and hiswan-based systems.

Access points 22 are typically connected to an Ethernet hub 26 by a wired LAN 28. The LAN serves as a distribution system (DS) for exchanging data between the access points and the hub. This arrangement enables mobile stations 24 to send and receive data through access points 22 to and from an external network 30, such as the Internet, via an access line 32 connected to hub 26. LAN 28 is typically capable of carrying data at high speeds—greater than the aggregate speed of wireless communications between the access points and mobile stations. Message latency on the LAN is high, however, generally on the order of milliseconds, due mainly to collision avoidance mechanisms that are inherent in the operation of Ethernet and other conventional LANs.

Figure 4:
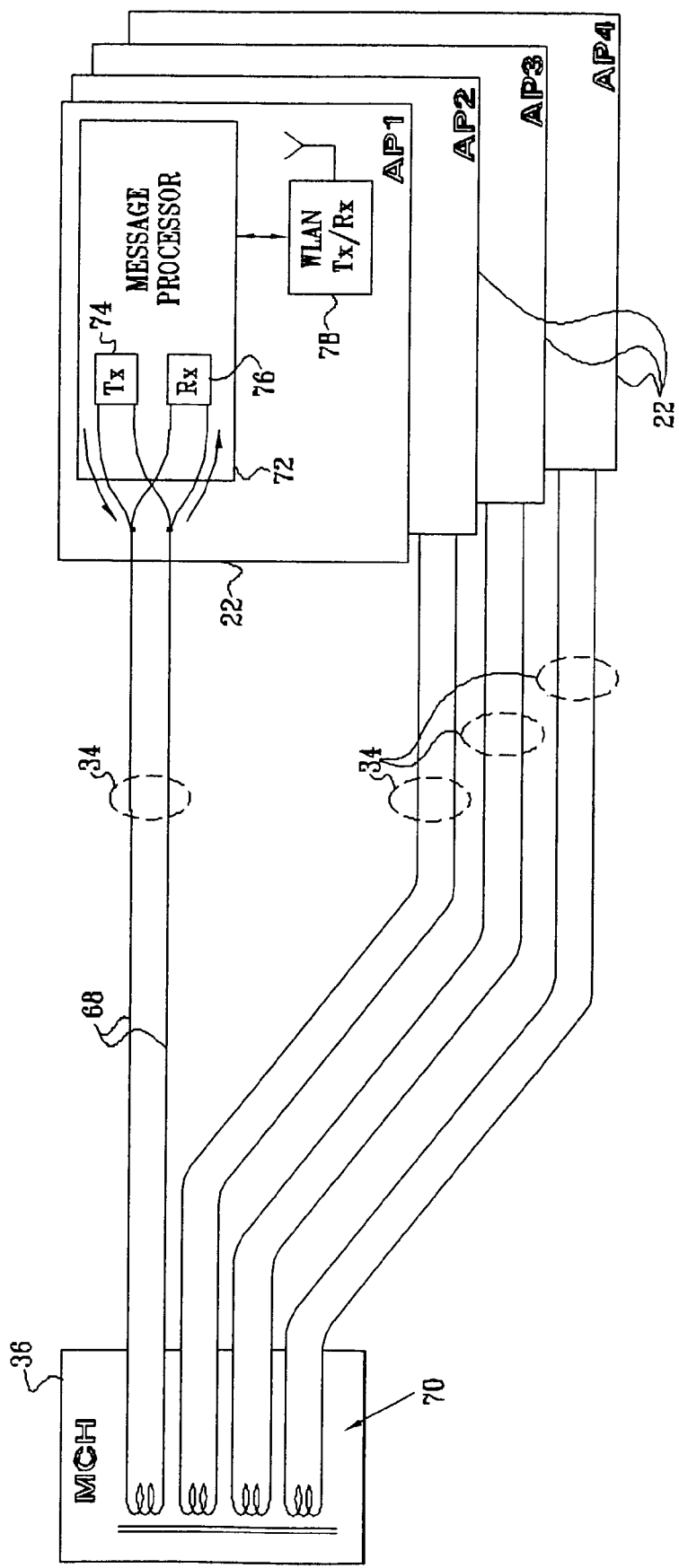
FIG. 4 is a block diagram that schematically illustrates communication links among multiple access points in a WLAN system, in accordance with a preferred embodiment of the present invention.

In addition to the conventional DS provided by LAN 28, access points 22 are also connected by a novel shared communication medium 34 to a MAC collaboration hub 36. Medium 34 may comprise substantially any suitable high-speed communication means, including wire, fiberoptics, or even free-space optical or radio communications (in an allowed frequency band that does not interfere with WLAN operation). For the sake of economy, medium 34 preferably comprises wires that run parallel to LAN 28. For example, medium 34 may comprise a twisted pair of wires that already exists in cabling of LAN 28, but which is not required for carrying LAN data. The function of MAC collaboration hub 36 is simply to connect medium 34 in such a way as to allow all access points 22 to broadcast and receive messages to and from all other access points. Therefore, unlike Ethernet hub 26, MAC collaboration hub 36 typically need not include a switch. Exemplary implementations of medium 34 and hub 36 are described hereinbelow with reference to FIGS. 4 and 5. Although the hub-and-spokes topology shown in FIGS. 1, 4 and 5 is generally the most convenient way to configure medium 34, alternative configurations will be apparent to those skilled in the art and are considered to be within the scope of the present invention.

Figure 2:
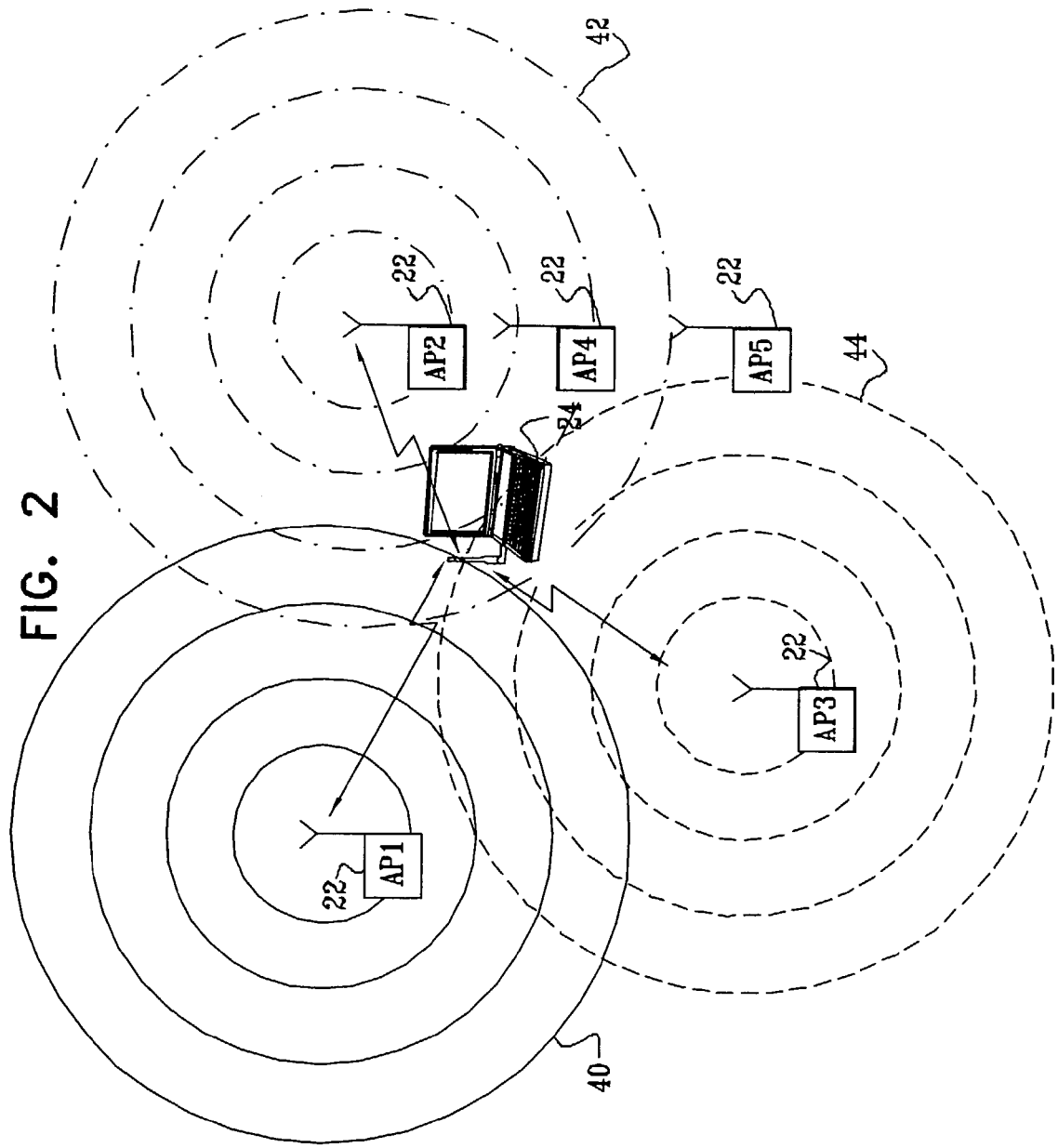
FIG. 2 is a schematic illustration of a mobile station communicating with multiple wireless access points, in accordance with a preferred embodiment of the present invention.

FIG. 2 is a schematic illustration of simultaneous radio communications between mobile station 24 and multiple access points 22 in system 20, in accordance with a preferred embodiment of the present invention. It is assumed that the access points labeled AP1, AP2 and AP3 are all operating on the same band, over which mobile station 24 seeks to communicate. (Access points AP4 and AP5 are assumed to be operating in a different band, and thus do not participate directly in this communication process.) Radio waves 40, 42 and 44 reach mobile unit 24 from AP1, AP2 and AP3, respectively, with similar amplitudes. By the same token, radio messages transmitted by mobile unit 24 are received at about the same time by AP1, AP2 and AP3. In WLAN systems known in the art, under these circumstances, mobile station 24 would receive downlink messages from two or more access points 22, which would probably result in inability of the mobile station to communicate with any of the access points. In preferred embodiments of the present invention, access points AP1, AP2 and AP3 communicate with one another over medium 34 in order to resolve this conflict, as described hereinbelow.

Figure 3:
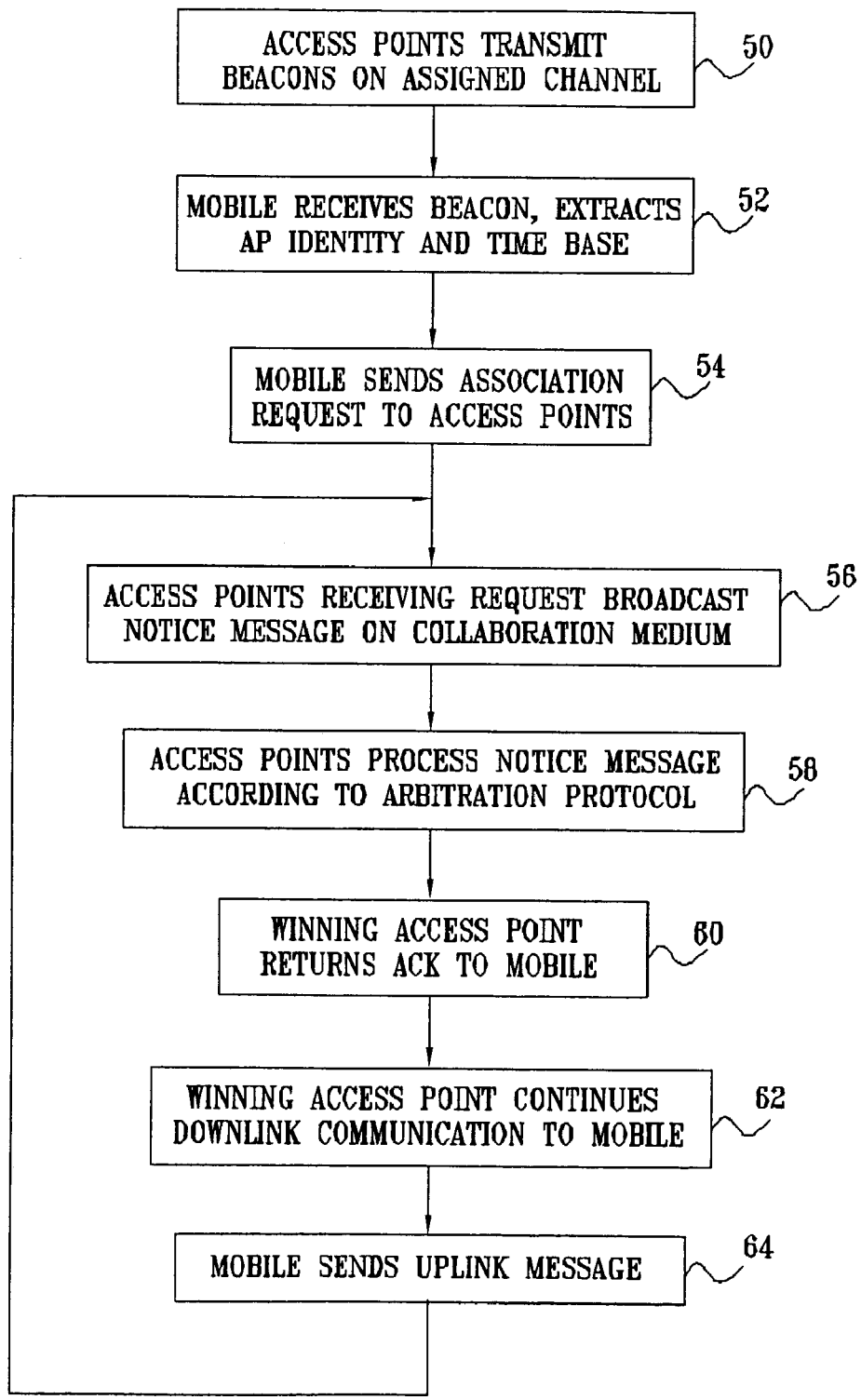
FIG. 3 is a flow chart that schematically illustrates a method for establishing a communication link between a mobile station and a wireless access point, in accordance with a preferred embodiment of the present invention.

FIG. 3 is a flow chart that schematically illustrates a method for establishing communications between mobile station 24 and one of access points 22 in system 20, in accordance with a preferred embodiment of the present invention. Access points 22 (say AP1, AP2 and AP3) transmit beacon signals on their common frequency channel, at a beacon transmission step 50. In accordance with the 802.11 standard, the beacon signals transmitted by any given access point provide the time base with which the mobile station should synchronize its communications and indicate the BSS identification (BSSID) of the access point. The BSSID can be regarded as the MAC address of the access point. In 802.11 WLAN systems known in the art, each access point has its own unique BSSID. In system 20, however, access points AP1, AP2 and AP3 share the same BSSID, so that they appear logically to the mobile station to be a single, extended, distributed access point, which has multiple antennas at different locations. The time bases of AP1, AP2 and AP3 are mutually synchronized using medium 34, and the beacon signals transmitted by the access points are interlaced to avoid collision between them.

When mobile station 24 receives a beacon signal of sufficient strength, it extracts the BSSID and time base from the signal, at a beacon processing step 52. This step, as well as subsequent steps taken by the mobile station, is completely in accordance with the 802.11 standard. In other words, the present invention can be implemented in a manner that is transparent to and requires no modification of legacy mobile stations. Using the time base and BSSID it has acquired, mobile station 24 sends an uplink signal, in the form of an association request message that is addressed to the BSSID and indicates the MAC address of the mobile station, at an association request step 52.

Ordinarily, in a conventional WLAN, the access point to which the association request is addressed will answer immediately with an acknowledgment (ACK). If the mobile station does not receive the ACK within a given timeout period, typically 10 µs, it submits an automatic repeat request (ARQ). Ultimately, the mobile station will treat the association request as having failed if it does not receive the required ACK. Therefore, to maintain 802.11 compatibility in system 20, one—and only one—of access points AP1, AP2 and AP3 must return an ACK to mobile station 24 within the 10 µs limit.

To determine which of the access points will respond to the association request message, access points AP1, AP2 and AP3 carry out an arbitration procedure using medium 34. For this purpose, all access points that received the association request message from mobile station 24 broadcast messages over medium 34, at a broadcast step 56, giving notice to the other access points that they have received an uplink message. Each broadcast message indicates the identity of the access point sending the message (i.e., a unique, internal identity, not the BSSID) and the MAC address of the mobile station in question. Preferably, to reduce the length of the broadcast message, the MAC address of the mobile station is hashed.

The access points send their messages over medium 34 in accordance with a predetermined protocol that makes it possible to distinguish messages sent simultaneously (or almost simultaneously) by different access points. For example, a time division multiple access (TDMA) protocol may be used, in which each access point has its own, assigned time slot. Alternatively, a code division multiple access (CDMA) protocol is used, as described below with reference to FIG. 6. Further alternatively, a frequency division multiplexing scheme may be used (or if medium 34 is implemented as a fiberoptic network, wavelength division multiplexing, as is known in the art).

The access points receive and process the broadcast messages sent over medium 34, at a processing step 58. Each access point is able to determine whether it was first to send its message, or whether another access point preceding it, by comparing the time of receipt of these broadcast messages to the time at which the access point sent its own broadcast message. (Access points operating on other frequency channels, as well as access points on the same frequency channel that did not receive an uplink signal from the mobile station identified in the broadcast message, may ignore the message.) Typically, the access point that was able to send its broadcast message first in response to an uplink message from a given mobile station is in the best position to continue communications with the mobile station, since this access point is generally the closest one to the mobile station. Therefore, all the access points independently choose this first access point to respond to mobile station 24. Alternatively, other criteria, such as received signal power, may be applied in choosing the "winning" access point, as long as the criteria are applied uniformly by all the access points. Preferably, if a deadlock occurs (such as when two access points send their broadcast messages at the same instant), a predetermined formula is applied by all the access points to resolve the deadlock uniformly.

The winning access point sends the required ACK message to mobile station 24, at an acknowledgment step 60. As noted above, the ACK must be sent within a short time, typically 10 μs, and steps 56, 58, and 60 must all be completed within this time. Access points 22 are able to meet this time constraint by using medium 34 as a dedicated, shared medium for this purpose, and by implementing a fast arbitration protocol, based on short broadcast messages, as described above. After sending the ACK, the winning access point typically sends an association response message to mobile station 24, and then continues its downlink transmission to the mobile station as appropriate, at a downlink step 62.

The winning access point continues serving the mobile station until the mobile station sends another uplink message, at a new uplink step 64. The arbitration protocol described above is then repeated, starting from step 56. A different access point may be chosen to serve the mobile station in the next round, particularly if the mobile station has moved in the interim. Even if the mobile station has moved, there is no need to repeat the association protocol. As noted above, all the access points belong to the same BSS, as though they were a single extended access point. Therefore, the same association of the mobile station is therefore maintained even if the arbitration process among the access points chooses a different "winner" to respond to the next uplink packet from the mobile station.

FIG. 4 is a block diagram that schematically shows details of communications by access points 22 over medium 34, in accordance with a preferred embodiment of the present invention. Medium 34 in this embodiment comprise pairs of wires 68 connecting each of access points 22 to hub 36. Hub 36 comprises a splitter 70, which joins wires 68 in such a way that medium 34 functions as a shared medium, i.e., so that signals transmitted onto wires 68 by any of access points 22 are received by all the other access points on medium 34. In the simplified embodiment shown in FIG. 4, splitter 70 comprises a passive, inductive coupler, which couples together all the pairs of wires. Alternatively or additionally, splitter 70 may comprise one or more amplifiers or other active elements, as are known in the art.

Each access point 22 comprises a message processor 72 for communicating with the other access points over medium 34 and carrying out the MAC-level collaboration protocol described above. Message processor 72 typically comprises a transmit circuit 74 and a receive circuit 76, for transmitting and receiving broadcast messages over medium 34. Preferably, to meet the timing requirements of an 802.11 WLAN, as noted above, circuits 74 and 76 and medium 34 operate with a bandwidth of at least 30 MHz. Message processor 72 interacts with and controls a WLAN transceiver 78, in compliance with the collaboration protocol. Transceivers 78 communicate over the air with mobile stations 24 in accordance with the applicable WLAN standards.

FIG. 5 is a block diagram that shows further details of communications between one of access points 22 and hubs 26 and 36, in accordance with a preferred embodiment of the present invention. For the sake of simplicity, only a single access point is shown in this figure. Typically, multiple access points are connected in like manner, as shown in FIG. 4.

In the present embodiment, a multi-conductor cable 86 is used to connect access points 22 in LAN 28. Typically, cable 86 comprises Category 5 (CAT-5) cabling, as is common in Ethernet LANs. Two twisted pairs of wires 82 and 84 (the 1–2 and 3–6 pairs in a CAT-5 cable) are used for transmitting and receiving data packets over LAN 28, between Ethernet hub 26 and an Ethernet interface 80 in access point 22. These data packets may comprise data sent between mobile stations 24 and network 30, via the access points. A remaining twisted pair 88 (the 4–5 pair) is not generally used for LAN data communications. Therefore, pair 88 serves as medium 34, carrying MAC collaboration messages between message processor 72 and hub 36. This novel use of pair 88 eliminates the need for separate wiring of medium 34.

In some LANs (and particularly LANs that are used to connect wireless access points), pair 88 is also used to convey DC power to access points 22. A power distribution hub 90, associated with Ethernet hub 26, is connected by pair 88 to a power supply circuit 92 in access point 22. In accordance with the IEEE 802.3af draft standard, hub 90 supplies 48 VDC over pair 88. This voltage is stepped down and regulated by power supply circuit 92 in order to provide operating power to the communication circuits of access point 22. The DC level on the wires of pair 88, however, does not prevent pair 88 from serving as medium 34. Rather, message processor 72 comprises a high-frequency coupler 94, typically an inductive coupler, which separates the high-speed communication traffic on medium 34 from the DC power.

FIG. 6 is a block diagram that schematically illustrates a broadcast packet 100 sent over medium 34 by one of access points 22, in accordance with a preferred embodiment of the present invention. Packet 100 is used by the access points to convey broadcast notice messages when they receive uplink communications from one of mobile stations 24, as described above with reference to FIG. 3 (step 56). The present embodiment assumes that the access points communicate over medium 34 using a CDMA protocol. CDMA has the advantage, by comparison with TDMA, that it allows all the access points to broadcast simultaneously and does not require a master clock, delay compensation or an intelligent central unit.

Packet 100 comprises a preamble 102, which is typically made up of a synchronization word 104 and an access point identifier 106. As noted above, identifier 106 is a proprietary, internal identification code, which uniquely identifies the access point sending the packet. Message processor 72 in each of access points 22 preferably has a set of data masks, which correspond respectively to preambles 102 of all the other access points that are configured to transmit and receive on the same WLAN frequency channel. As the message processor receives data over medium 34, it compares the data against each of its masks in order to detect the beginning of a new packet and the identity of the access point that sent the packet. Walsh codes may be used advantageously for this purpose, as is known in the CDMA art.

Preamble 102 is followed by a broadcast message 108, which identifies the mobile station that sent the uplink message reported by packet 100. After message processor 72 has succeeded in decoding preamble with one of its data masks, it uses the same data mask to decode message 108. The message processor thus identifies both the mobile station that sent the uplink message and the access point that received it first, and in this way is able to decide which access point should respond to the uplink message, as described above optionally, message 108 may include other parameters, such as the power level of the received uplink message and/or an identification of the antenna on which the access point received the message. (For diversity purposes, access points generally have multiple antennas.) These additional parameters may be used, in addition to or instead of the time of receipt of packet 100, in arbitrating among the access points.

As noted above, although preferred embodiments are described herein with reference to particular types of wireless and wired LANs and particular communication standards, the principles of the present invention are similarly applicable to other types of LANs and WLANs, which may operate in accordance with other standards. In addition, these principles may be applied in wireless personal area networks (PANs), as defined by IEEE Standard 802.15, including ultra-wide band (UWB) PANs. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Apparatus for network communication, comprising:
   a cable arranged to form a wired local area network (LAN), the cable comprising at least first and second conductors; and
   a plurality of access points interconnected by the cable and arranged in a wireless local area network (WLAN) to communicate over the air on a common frequency channel with a mobile station, the access points being adapted to convey data to and from the mobile station over the LAN via the first conductor and to exchange control messages among the access points via the second conductor,
   wherein the access points comprise message processors, coupled to the second conductor, which are adapted, upon receiving at one or more of the access points an uplink signal transmitted over the WLAN by the mobile station on the common frequency channel, to arbitrate among the access points receiving the uplink signal by sending and receiving the control messages over the second conductor so as to select one of the access points to respond to the uplink signal.

2. Apparatus according to claim 1, wherein the access points are adapted to convey the data over the LAN in accordance with a first media access control (MAC) protocol, and to exchange the control messages using a second MAC protocol, different from the first MAC protocol.

3. Apparatus according to claim 2, wherein the first MAC protocol is characterized by a first latency, and wherein the second MAC protocol is characterized by a second latency, which is lower than the first latency.

4. Apparatus according to claim 2, wherein the first MAC protocol comprises an Ethernet protocol.

5. Apparatus according to claim 1, wherein the second conductor is configured as a shared medium, so that the control messages transmitted onto the second conductor by any of the access points are received by all the other access points via the shared medium.

6. Apparatus according to claim 1, wherein the cable comprises multiple twisted wire pairs, comprising at least a first wire pair that includes the first conductor, and at least a second wire pair that includes the second conductor.

7. Apparatus according to claim 6, wherein the cable comprises a Category 5 (CAT-5) cable.

8. Apparatus for network communication, comprising:
   a cable arranged to form a wired local area network (LAN), the cable comprising at least first and second conductors; and
   a plurality of access points interconnected by the cable and arranged in a wireless local area network (WLAN) to communicate over the air on a common frequency channel with a mobile station, the access points being adapted to convey data to and from the mobile station over the LAN via the first conductor and to exchange control messages among the access points via the second conductor,
   wherein the access points are adapted to convey the data over the LAN in accordance with a first media access control (MAC) protocol, and to exchange the control messages using a second MAC protocol, different from the first MAC protocol,
   wherein the second MAC protocol comprises a multiple access protocol, which can be used by two or more of the access points to transmit the control messages over the second conductor substantially simultaneously.

9. Apparatus according to claim 8, wherein the multiple access protocol comprises a code division multiple access (CDMA) protocol.

10. Apparatus for network communication, comprising:
    a cable arranged to form a wired local area network (LAN), the cable comprising at least first and second conductors;
    a plurality of access points interconnected by the cable and arranged in a wireless local area network (WLAN) to communicate over the air on a common frequency channel with a mobile station, the access points being adapted to convey data to and from the mobile station over the LAN via the first conductor and to exchange control messages among the access points via the second conductor; and
    a switching hub, which is coupled to the first conductor so as to control a flow of the data to and from the access points over the LAN, substantially without affecting the control messages on the second conductor,
    wherein the second conductor is configured as a shared medium, so that the control messages transmitted onto the second conductor by any of the access points are received by all the other access points via the shared medium.

11. Apparatus for network communication, comprising:
    a cable arranged to form a wired local area network (LAN), the cable comprising at least first and second conductors;
    a plurality of access points interconnected by the cable and arranged in a wireless local area network (WLAN) to communicate over the air on a common frequency channel with a mobile station, the access points being adapted to convey data to and from the mobile station over the LAN via the first conductor and to exchange control messages among the access points via the second conductor; and
    a DC power source, which is coupled to provide electrical power to the access points over the second conductor,
    wherein the access points comprise modulation circuitry, coupled to the second conductor, for conveying the control messages over the second conductor simultaneously with the electrical power.

12. A method for network communication, comprising:
    arranging a plurality of access points in a wireless local area network (WLAN) to communicate over the air on a common frequency channel with a mobile station;
    linking the access points together by a cable to form a wired local area network (LAN), the cable comprising at least first and second conductors; and conveying data via the first conductor over the LAN to and from the access points for transmission over the air to and from the mobile station; and exchanging control messages among the access points via the second conductor, wherein exchanging the control messages comprises receiving at one or more of the access points an uplink signal transmitted over the WLAN by the mobile station on the common frequency channel, and arbitrating among the access points receiving the uplink signal by sending and receiving the control messages over the second conductor so as to select one of the access points to respond to the uplink signal.

13. A method according to claim 12, wherein conveying the data comprises sending the data over the LAN in accordance with a first media access control (MAC) protocol, and wherein exchanging the control messages comprises sending the control messages using a second MAC protocol, different from the first MAC protocol.

14. A method according to claim 13, wherein the first MAC protocol is characterized by a first latency, and wherein the second MAC protocol is characterized by a second latency, which is lower than the first latency.

15. A method according to claim 13, wherein the first MAC protocol comprises an Ethernet protocol.

16. A method according to claim 13, wherein the second MAC protocol comprises a multiple access protocol, which can be used by two or more of the access points to send the control messages over the second conductor substantially simultaneously.

17. A method according to claim 16, wherein the multiple access protocol comprises a code division multiple access (CDMA) protocol.

18. A method according to claim 12, wherein linking the access points comprises configuring the second conductor as a shared medium, so that the control messages transmitted onto the second conductor by any of the access points are received by all the other access points via the shared medium.

19. A method according to claim 18, and comprising switching a flow of the data sent to and from the access points over the LAN on the first conductor, substantially without affecting the control messages on the second conductor.

20. A method according to claim 12, and comprising coupling a DC power source to provide electrical power to the access points over the second conductor, wherein exchanging the control messages comprises conveying the control messages over the second conductor as modulated signals simultaneously with the electrical power.

21. A method according to claim 12, wherein the cable comprises multiple twisted wire pairs, comprising at least a first wire pair that includes the first conductor, and at least a second wire pair that includes the second conductor.

22. A method according to claim 21, wherein the cable comprises a Category 5 (CAT-5) cable.

* * * * *